Aug. 5, 1958 B. P. BLASINGAME 2,846,577

ELECTRONIC A. C. INTEGRATOR OR INTEGRATING OSCILLATOR

Filed March 1, 1955 2 Sheets-Sheet 1

INVENTOR.
Benjamin P Blasingame
BY

ELECTRONIC A. C. INTEGRATOR OR INTEGRATING OSCILLATOR

Filed March 1, 1955 2 Sheets-Sheet 2

INVENTOR.

Benjamin P. Blasingame

BY 2,846,577
Patented Aug. 5, 1958

2,846,577

ELECTRONIC A. C. INTEGRATOR OR INTEGRATING OSCILLATOR

Benjamin P. Blasingame, Palos Verdes Estates, Calif.

Application March 1, 1955, Serial No. 491,287
1 Claim. (Cl. 250—27)

Figure 1:
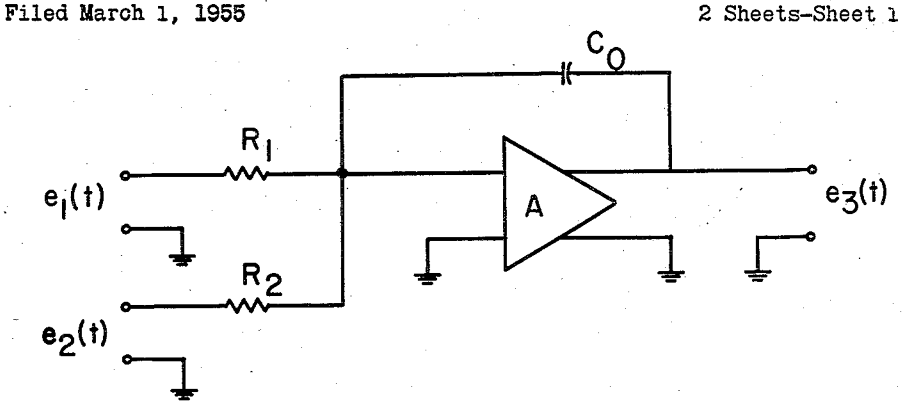

This invention relates to analogue computers, automatic control systems, and to simulators for the simulation of the dynamic response of dynamic systems.

In most applications of analogue computers, it is necessary to have devices which will perform physically the fundamental mathematical operations of addition, multiplication, and integration. In certain mechanical analogue computers, the physical integrators consist of a disc driven by a small wheel or ball whose radial distance from the center of the driven disc is controllable. These are commonly known as ball and disc integrators. With such devices it is possible to obtain the integral of any variable with respect to any other variable. In most electrical analogue computers, where the magnitude of a voltage represents the magnitude of some variable, the physical integrators are of two basic types: electronic and motor-generator. In both of these, a variable may be integrated only with respect to time, because of the inherent fundamental process by which the integration is accomplished. Available electronic integrators employ a very high gain amplifier with capacitor feedback around the amplifier. Such devices integrate with respect to time whatever voltage is applied to their input. Thus, if a modulated carrier signal voltage is applied, the output is the integral of the product of the modulating signal and the carrier. For this reason, when using a modulated carrier system it is necessary to demodulate the signal voltage, integrate only the modulating signal, and then remodulate the output. With the motor-generator type of integrator, it is possible to use a two phase alternating current motor so that the rotation of the motor shaft is the time integral of the modulating signal without involving a specific process of demodulation. This shaft rotation may then be converted back to a modulated carrier by gearing the shaft to a potentiometer or a variable transformer or a signal generator which is excited by the carrier signal. Thus, with such systems, the action of this potentiometer or signal generator may be identified as a process of remodulation.

It is seen that in the application to A. C. systems of either type of electrical integrator, electronic or motor-generator, one or the other or both of the process of demodulation or remodulation is or are employed.

Systems which use modulated carriers as the signal voltage are especially convenient because so many data transmission systems and signal generators such as synchros, resolvers, microsyns and the like are inherently alternating current devices in which the output signal is a modulated carrier. Thus, it is especially advantageous to have analogue computing elements which can accept signal modulated carriers and operate only on the modulating signal and not on the carrier voltage.

An object of this invention is to provide an integrator which will produce a modulated signal output the modulation of which is the time integral of the input modulating signal. Stated more precisely in mathematical terminology, the device of this invention accepts as its input the voltage:

$$g(t)\ \sin\ (\omega t)$$

where:

$g(t)$ is the modulating signal voltage
sin $(\omega t)$ is the carrier voltage of frequency $\omega$ or $2\pi f$, $\omega$ being measured in radians per second and $f$ being measured in cycles per second and produces as its output the voltage:

$$\int_0^t g(x)dx\ \sin\ (\omega t)$$

Or in equivalent notation:

$$[\int g(t)dt]\ \sin\ (\omega t)$$

where:

$x$ is a "dummy variable of integration" used to indicate explicitly the function being integrated.

A further object of this invention is to obtain an electronic integrator which employs an A. C. coupled amplifier rather than a D. C. coupled amplifier which is normally associated with such devices, yet can integrate signals the modulation of which includes D. C. or zero frequency components.

According to this invention, a modulated A. C. carrier type electronic integrator is obtained by enclosing a high gain A. C. coupled amplifier and associated input resistors within two feedback loops, the inner loop or subloop being closed through a capacitor connected between output and input of the amplifier and the outer loop through an appropriate phase shifting device connecting the output of the amplifier to an input resistor in series with the amplifier. This phase shifting device provides a 90° phase shift at the carrier frequency but negligible phase shift of the modulating signal since the highest frequency components of the modulating signal are of a much lower frequency than that of the carrier voltage. The output voltage of this phase shifting device is multiplied by a constant equal to the carrier frequency and added to the integrator input signal. The time integral of the sum of this voltage and the input signal is then the desired output. This desired output is the time integral of the modulating signal of the input multiplied by the carrier voltage.

Figure 2:
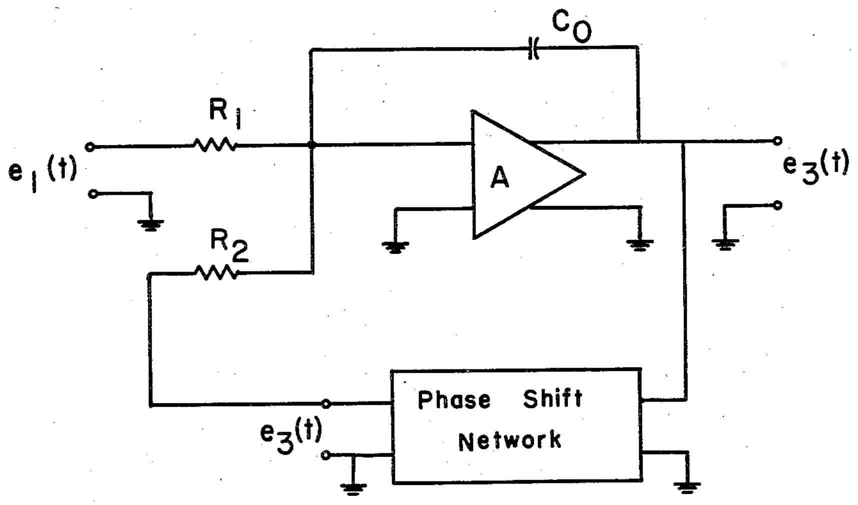
Figure 3:
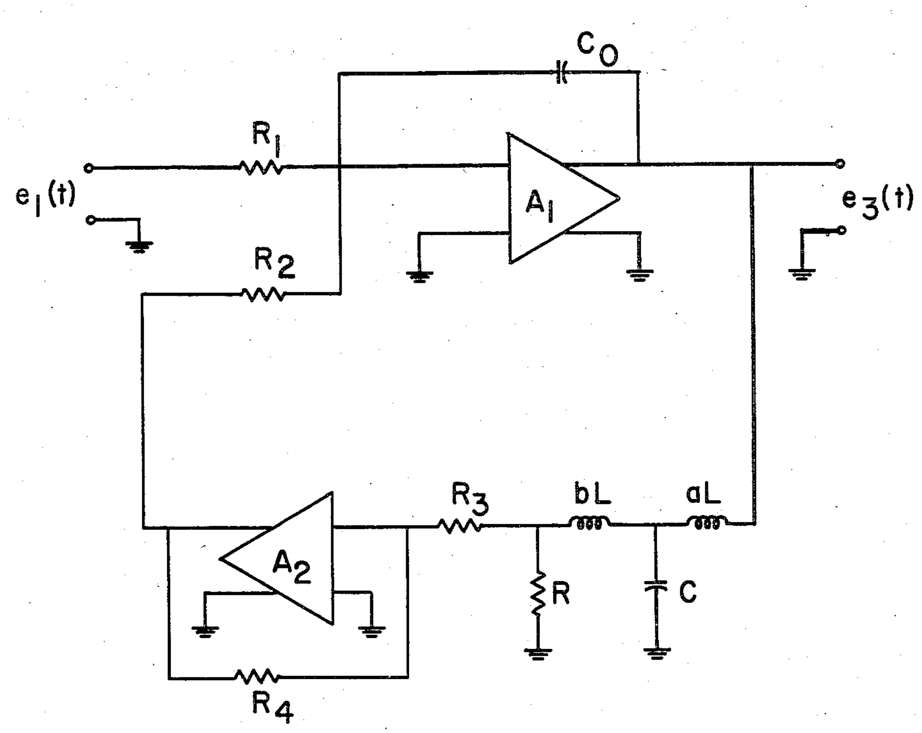

Other objects and structural details of this invention will be apparent from the following description when read in connection with the accompanying figures, wherein:

Figure 1 illustrates an electronic integrator typical of current design practice Figure 2 illustrates an electronic integrator of this invention Figure 3 illustrates an electronic integrator of this invention with a specific design of the phase shift network.

The operation of conventional electronic integrators is described in the literature, see for example Electronic Instruments, Greenwood, Holdam, and Reed, and Waveforms, Chance and others, volumes 21 and 19 of the Radiation Laboratory Series. High precision integrators of the type illustrated in Figure 1 are used in several commercial electronic analogue computers. For completeness and to provide background for description of this invention, their operation is described in the following. With reference to Figure 1, the following equations expressing the relation between $e_1(t)$, $e_2(t)$, $e_g(t)$, and $e_3(t)$ may be written:

The gain of the amplifier is denoted $-G$.

The current through the feedback condenser is denoted by $i(t)$.

The current through $R_1$ by $i_1(t)$.

The current through $R_2$ by $i_2(t)$.

Then:

$$e_3(t)=-Ge_g(t) \tag{1}$$

$$i(t)=i_1(t)+i_2(t) \tag{2}$$

$$e_g(t)-e_3(t)=\frac{1}{C_0}\int i(t)dt \tag{3}$$

$$i_1(t)=\frac{e_1(t)-e_g(t)}{R_1} \tag{4}$$

$$i_2(t)=\frac{e_2(t)-e_g(t)}{R_2} \tag{5}$$

$$e_g(t)-e_3(t)=\frac{1}{C_0}\int\left[\frac{e_1(t)-e_g(t)}{R_1}+\frac{e_2(t)-e_g(t)}{R_2}\right]dt \tag{6}$$

$$e_g(t)+\frac{1}{R_1C_0}\int e_g(t)dt+\frac{1}{R_2C_0}\int e_g(t)dt-e_3(t)=\frac{1}{R_1C_0}\int e_1(t)dt+\frac{1}{R_2C_0}\int e_2(t)dt \tag{7}$$

substitute:

$$e_g(t)=\frac{1}{-G}e_3(t)\frac{1}{-G}\left[e_3(t)+\frac{1}{R_1C_0}\int e_3(t)dt+\frac{1}{R_2C_0}\int e_3(t)dt\right]-e_3(t)=\frac{1}{R_1C_0}\int e_1(t)dt+\frac{1}{R_2C_0}\int e_2(t)dt \tag{8}$$

If G is made very large: for example 1,000 to 100,000; then to a first approximation:

$$e_3(t)=-\frac{1}{R_2C_0}\int e_1(t)dt-\frac{1}{R_2C_0}\int e_2(t)dt \tag{9}$$

Both $e_1(t)$ and $e_2(t)$ are voltages which are arbitrary functions of time. Thus, the output voltage, $e_3(t)$, is seen from equation 9 to be the time integral of the sum of the input voltages with an accuracy proportional to the reciprocal of the amplifier gain. Actually, more than two input voltages may be added and simultaneously integrated by a device of this type; for simplicity only two have been shown here.

In most analogue computer operations, the voltages $e_1(t)$, $e_2(t)$, and $e_3(t)$ change relatively slowly with respect to time so that they contain very low frequency Fourier components. For this reason, the amplifiers used in these devices are usually D. C. coupled to insure adequate low frequency (low frequency here to include zero frequency or direct current) performance of the device.

Consider now what the output voltage of the integrator of Figure 1 would be if a signal modulated carrier voltage were applied to the input. (For the moment consider that $e_2(t)$ is zero). The input voltage $e_1(t)$ is then:

$$e_1(t)=g(t)\sin(\omega) \tag{10}$$

where:

$g(t)$ is the modulating signal $\sin(\omega t)$ is the carrier voltage of frequency $\omega=2\pi f$ radians per second or $f$ cycles per second then:

$$e_3(t)=\int g(t)\sin(\omega t)dt=\int_0^t g(x)\sin(\omega x)dx \qquad {}^{1}(11)$$

Recalling the formula (integration by parts):

$$\int udv=uv-\int vdu \tag{12}$$

let:

$$u=\sin(\omega x) \tag{13}$$

$$du=\omega\cos(\omega x)dx \tag{14}$$

$$dv=g(x)dx \tag{15}$$

$$v=\int_0^t g(x)dx \tag{16}$$

then:

$$e_3(t)=\int_0^t g(x)dx\sin(\omega t)-\int_0^t\int_0^s g(x)dx\omega\cos(\omega s)ds \qquad {}^{1}(17)$$

[1] $x$ and $s$ are "dummy variables of integration" used to indicate explicitly the function being integrated and the order of integration.

The desired output is the time integral of the modulating signal multiplied by the carrier signal or simply the first term of the right hand side of equation 17. From equation 17 it is clear that the output of the integrator contains an undesired voltage, specifically the second term of equation 17. This unwanted voltage cannot be separated from the desired output and rejected. The only means to avoid this problem with available integrators is to first demodulate the input signal so that:

$$e_1(t)=g(t) \tag{18}$$

then:

$$e_3(t)=\int_0^t g(x)dx \tag{19}$$

and then remodulate the output so that the final output voltage, $$e_0(t)=\left[\int_0^t g(x)dx\right]\sin(\omega t) \tag{20}$$

is obtained.

This describes completely why the electronic integrators represented by the present state of the art are difficult to employ in systems in which the signal is available only as a modulated carrier signal voltage.

The device of this invention solves this problem by supplying an additional voltage at the input to the integrator such that the integral of the sum of this voltage and the input voltage is in fact the desired output. To explain its operation, consider first the desired output, $$\int_0^t g(x)dx\sin(\omega t)$$

the available input, $g(t)\sin(\omega t)$ and then determine what voltage must be integrated to obtain the desired output. Clearly this latter is simply the time derivative of the desired output or:

$$\frac{d}{dt}\left[\int_0^t g(x)dx\sin(\omega t)\right]$$

Recalling the formula:

$$\frac{d}{dx}uv=\frac{du}{dx}v+\frac{dv}{dx}u \tag{21}$$

$$\frac{d}{dt}\left[\int_0^t g(x)dx\sin(\omega t)\right]=g(t)\sin(\omega t)+\int_0^t g(x)dx\omega\cos(\omega t) \tag{22}$$

Now, recognize the following: $g(t)\sin(\omega t)$ is the available input, and the desired output $$\int_0^t g(x)dx\sin(\omega t)$$

if multiplied by the carrier frequency $\omega$ and the carrier shifted 90° or $\pi/2$ radians in phase [$\cos(\omega t)=\sin(\omega t+\pi/2)$], would be $$\int_0^t g(x)dx\omega\cos(\omega t)$$

The latter is the additional input needed.

Recognition of this fact suggests the use of regeneration or feedback as shown in Figure 2 to supply the required additional voltage to the integrator input. This additional feedback loop must contain provision for shifting the phase of the carrier voltage by 90° without materially shifting the phase of the modulating signal and must have a gain $\omega$ times that of the input channel. As will be shown in the following paragraphs, this can be accomplished by an appropriately designed filter inserted in the feedback loop and by selecting the proper ratio of the input resistors $R_1$ and $R_2$, or by demodulating the output voltage and remodulating with a carrier which is shifted in phase by 90°. This phase shifted carrier may be obtained readily from the reference carrier voltage by means of passive differentiating networks which accomplish the 90° phase shift and simultaneously amplify the signal by $\omega$, the carrier frequency.

In any modulated carrier system, the frequency of the carrier exceeds the highest frequency components of the modulating signal voltage by a large factor. This is necessary to prevent loss of information content during de-modulation for example. In general, this factor should be in the order of 50 to 1,000. For this reason, a phase shift network designed to give 90° phase shift at the carrier frequency will produce negligible phase shift of the modulating signal.

A practical integrator of this design including an appropriate phase shift network is shown in Figure 3. A second amplifier is shown associated with the phase shift network. This amplifier, having a gain equal to $$\frac{R_4}{R_3}$$

supplies part of the large gain required in this feedback loop. Actually $R_3$ and $R_4$ would together be the resistance element of a potentiometer and the amplifier input would be taken from the wiper arm of this potentiometer. This provides a means for adjusting the gain of the feedback loop to the point just short of instability.

In any closed loop system, stability is, of course, an overriding consideration. There are two conditions of instability possible with this device. The first is the D. C. instability. If direct coupled amplifiers were used, the system would proceed to saturation immediately upon excitation because of the positive feedback. This instability is avoided by use of A. C. coupled amplifiers. The second possible instability is a dynamic or oscillatory instability which can occur at the carrier frequency for which the integrator is designed. In fact this device is a unique form of controlled oscillator in which the amplitude of the output is the time integral of the amplitude of an input or controlling voltage. Thus, this device may be described as an "integrating oscillator." By adjusting the loop gain to be just under unity at the carrier frequency, the output, if initially established at some value will gradually decay and stability is assured.

Referring to the phase shift network of Figure 3, let:

$$\sqrt{LC}=T \qquad a=\tfrac{1}{2}$$
$$R=\tfrac{3}{4}\sqrt{L/C} \qquad b=\tfrac{1}{4}$$

Then the network transfer function, ratio of voltage at network output to voltage at network input, is:

$$\frac{6}{(Tj\omega)^3+3(Tj\omega)^2+6(Tj\omega)+6}$$

where, $\omega=2\pi f$ is the frequency in radians per second, $f$ being in cycles per second and $j$ is the imaginary unit $\sqrt{-1}$.

Such a network is the third order approximation to a pure delay line. The design parameter $T=\sqrt{LC}$ is selected such that the real part of this transfer function vanishes at the carrier frequency thus: $3(T\omega_0)^2=6$ where $\omega_0$=the carrier frequency in radians per second for which the device is designed, so that, at the carrier frequency, 90° phase shift is obtained. At this frequency there is a slight network amplitude gain which may be compensated for in the loop gain setting.

As mentioned earlier, part of the loop gain may be supplied by making $R_2$ smaller than $R_1$ by some desirable factor such as 10. From Equation 9, it is seen that with $R_1C_0$ made equal to unity for example: making $R_2=(\tfrac{1}{10})\ R_1$ would cause the gain through this channel to be 10.

The device of this invention thus produces an electronic integrator which accepts a signal modulated carrier as its input and produces a modulated carrier output, the modulation of which is the time integral of the input modulation. Further, it performs this mathematical function without involving either the processes of demodulation or modulation and further, its design includes only A. C. coupled amplifiers as distinguished from the prior art, in which all modulated carrier integrators employ either the process of de-modulation or modulation and, if electronic, employ D. C. coupled amplifiers. This use of A. C. coupled amplifiers is a most important distinction in as much as such amplifiers are especially easy of design, cheap in construction, are largely immune to disturbance and irregularities in the supply voltages, and the output voltage has no tendency to drift, whereas, D. C. coupled amplifiers are difficult of design, suffer severe drift if the supply voltages fluctuate and are especially expensive to construct.

By this invention, there is thus produced a new and useful electronic A. C. integrator or integrating oscillator especially adapted to use in analog devices employing modulated carrier data transmission.

While the above description discloses but one specific embodiment of the device of this invention, it is possible to produce still other embodiments without departing from the spirit thereof, and it is desired, therefore, that only such limitation shall be imposed upon the appended claim as are stated therein or required by the prior art.

What is claimed is:

An electronic integrator having means to accept as input a signal modulated carrier voltage expressed mathematically as:

$$g(t)\sin(\omega t)$$

where:

$g(t)$ is the modulating signal voltage $\sin(\omega t)$ is the carrier voltage of frequency $\omega$ or $2\pi f$, $\omega$ being measured in radians per second and $f$ being measured in cycles per second means to produce as output a signal modulated carrier voltage expressed mathematically as:

$$[\int g(t)dt]\sin(\omega t)$$

means to shift the phase of the carrier of the output voltage by 90°, and means to amplify, feedback, and combine this shifted or delayed voltage with the input voltage.

References Cited in the file of this patent

A Stabilized Driftless Analog Integrator, I. R. E., Transactions-Electronic Computers, December 1954, pp. 19–20, by Howard Hamer, 235–61 INT.